(12) United States Patent
Bree

(10) Patent No.: US 7,210,241 B1
(45) Date of Patent: May 1, 2007

(54) ELECTRICAL JUNCTION BOX TEMPLATE AND METHOD OF USE

(76) Inventor: Aaron Bree, 112 Iris Rd., Lakewood, NJ (US) 08701

( * ) Notice: Subject to any disclaimer, the term of this patent is extended or adjusted under 35 U.S.C. 154(b) by 0 days.

(21) Appl. No.: 11/342,227

(22) Filed: Jan. 27, 2006

(51) Int. Cl.
*G01B 5/14* (2006.01)
*G01B 3/14* (2006.01)

(52) U.S. Cl. .................. 33/528; 33/DIG. 10
(58) Field of Classification Search ........... 33/528, 33/DIG. 10
See application file for complete search history.

(56) References Cited

U.S. PATENT DOCUMENTS

| | | | | |
|---|---|---|---|---|
| 2,898,688 A | * | 8/1959 | Cottar | 33/528 |
| 3,884,280 A | * | 5/1975 | Chailer | 33/DIG. 10 |
| 3,888,013 A | * | 6/1975 | Benoit | 33/528 |
| 3,924,331 A | * | 12/1975 | Goosen | 33/DIG. 10 |
| 3,940,857 A | * | 3/1976 | Giordano | 33/528 |
| 4,059,905 A | * | 11/1977 | Wieting | 33/528 |
| 4,339,973 A | * | 7/1982 | Lawrence | 33/DIG. 10 |
| 4,793,069 A | * | 12/1988 | McDowell | 33/528 |
| 4,953,733 A | * | 9/1990 | Loscuito | 33/528 |
| 5,172,483 A | * | 12/1992 | Yocono et al. | 33/528 |
| 5,692,357 A | * | 12/1997 | McCain | 33/528 |
| 5,813,130 A | * | 9/1998 | MacDowell | 33/528 |
| 6,101,731 A | * | 8/2000 | Mesa | 33/528 |
| 6,434,848 B1 | * | 8/2002 | Gordon et al. | 33/528 |
| 6,463,668 B1 | * | 10/2002 | Williams | 33/528 |
| 6,944,964 B1 | * | 9/2005 | Easter et al. | 33/528 |

* cited by examiner

*Primary Examiner*—Christopher W. Fulton
(74) *Attorney, Agent, or Firm*—Arthur M. Peslak

(57) ABSTRACT

A device and method for accurately locating electrical junction box openings in sheetrock walls is disclosed. The various embodiments disclosed means for predetermining the shape of the hole to be cut in the wall to locate the electrical junction box and then to place the appropriate hole in the wall.

1 Claim, 6 Drawing Sheets

ELECTRICAL JUNCTION BOX TEMPLATE AND METHOD OF USE

BACKGROUND OF THE INVENTION

The present invention is directed to the field of devices used to create cutouts in sheetrock walls for electrical devices and junction boxes. A recurring problem for do-it-yourself homeowners and professional contractors is accurately locating a hole for the electrical junction box that is both square and level. The present invention in its various embodiments, solves this problem in a simple and accurate fashion.

SUMMARY OF THE INVENTION

The present invention is directed to a device and method for accurately locating openings in wall surfaces for electrical junction boxes. Two embodiments of the present invention are directed to placing cut-outs in existing walls while the third embodiment is directed to construction of new walls. The present invention is also directed to a method of using the device to create cut-outs in walls.

DETAILED DESCRIPTION OF THE PRESENT INVENTION

The present invention will now be described in terms of the presently preferred embodiments thereof as illustrated in the appended drawings. Those of ordinary skill in the art will recognize that many obvious modifications may be made thereto without departing from the spirit or scope of the present invention.

Figure 1:
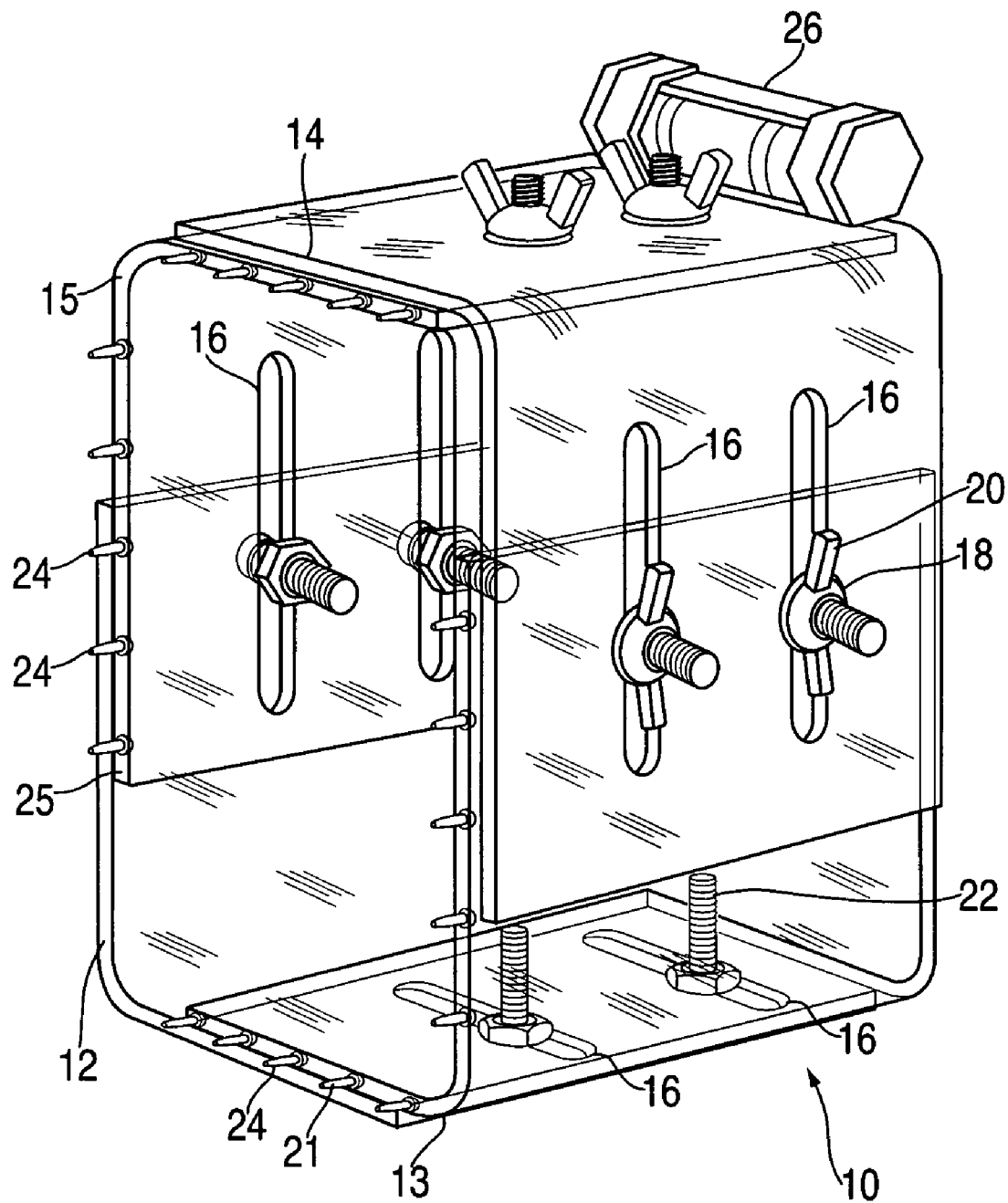
FIG. 1 is a plan view of an embodiment of the present invention.

FIGS. 1 to 4 illustrate a first embodiment of the present invention. A hollow box 10 comprises two mating half rectangular shells 12 and 14. As described below, the box 10 can be adjusted in size to match the size of an electrical junction box. The shells each comprise a plurality of slots 16. The four mating shells 12, 13, 14 and 15 are connected by a plurality of fasteners 18 through the corresponding slots 16. The fasteners 18 illustrated in FIG. 1 are conventional wing nuts 20 and bolts 22 but those of ordinary skill in the art will recognize that other similar fastening devices may be used.

In the embodiment shown in FIG. 1, the size and shape of the box 10 can be adjusted by loosening the bolts and screws and sliding the mating shells 12 and 14 relative to each other until the desired size of the electrical junction box to be installed in the wall is achieved.

The box 10 further comprises a plurality of sharp and generally stiff projections 24 on its back surface 25. As described below, in use, the sharp projections 24 will be utilized to create an outline for the junction box hole on an existing wall. The box 10 also comprises a bubble level 26 on its top surface.

Figure 2:
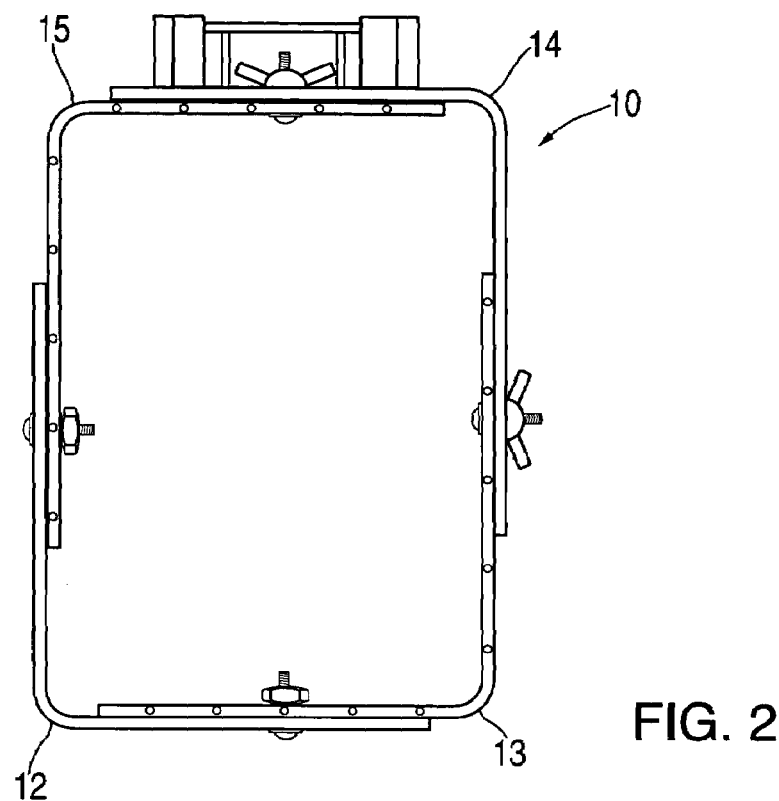
FIG. 2 is a back view of the embodiment illustrated in FIG. 1.
Figure 3:
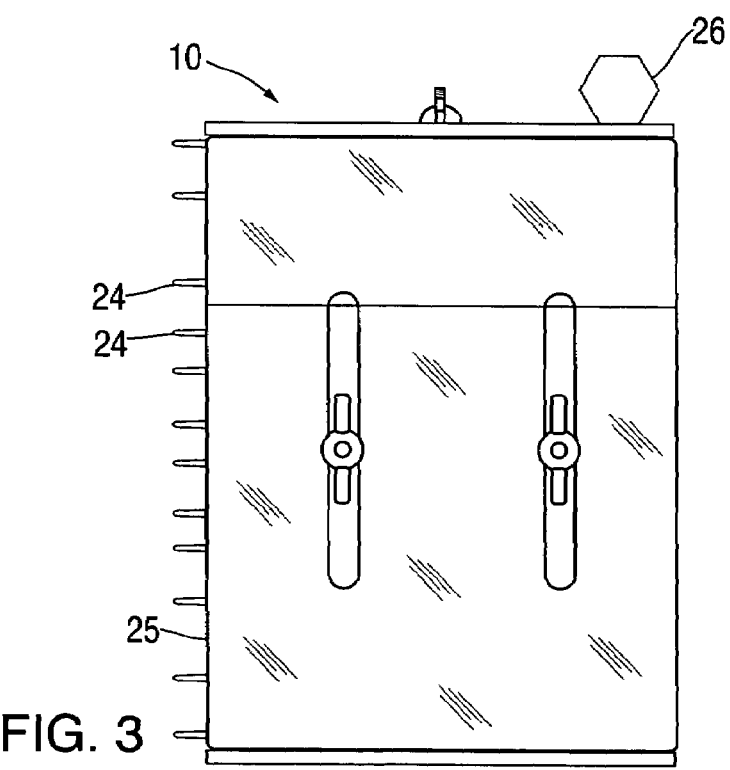
FIG. 3 is a side view of the embodiment illustrated in FIG. 2.
Figure 4:
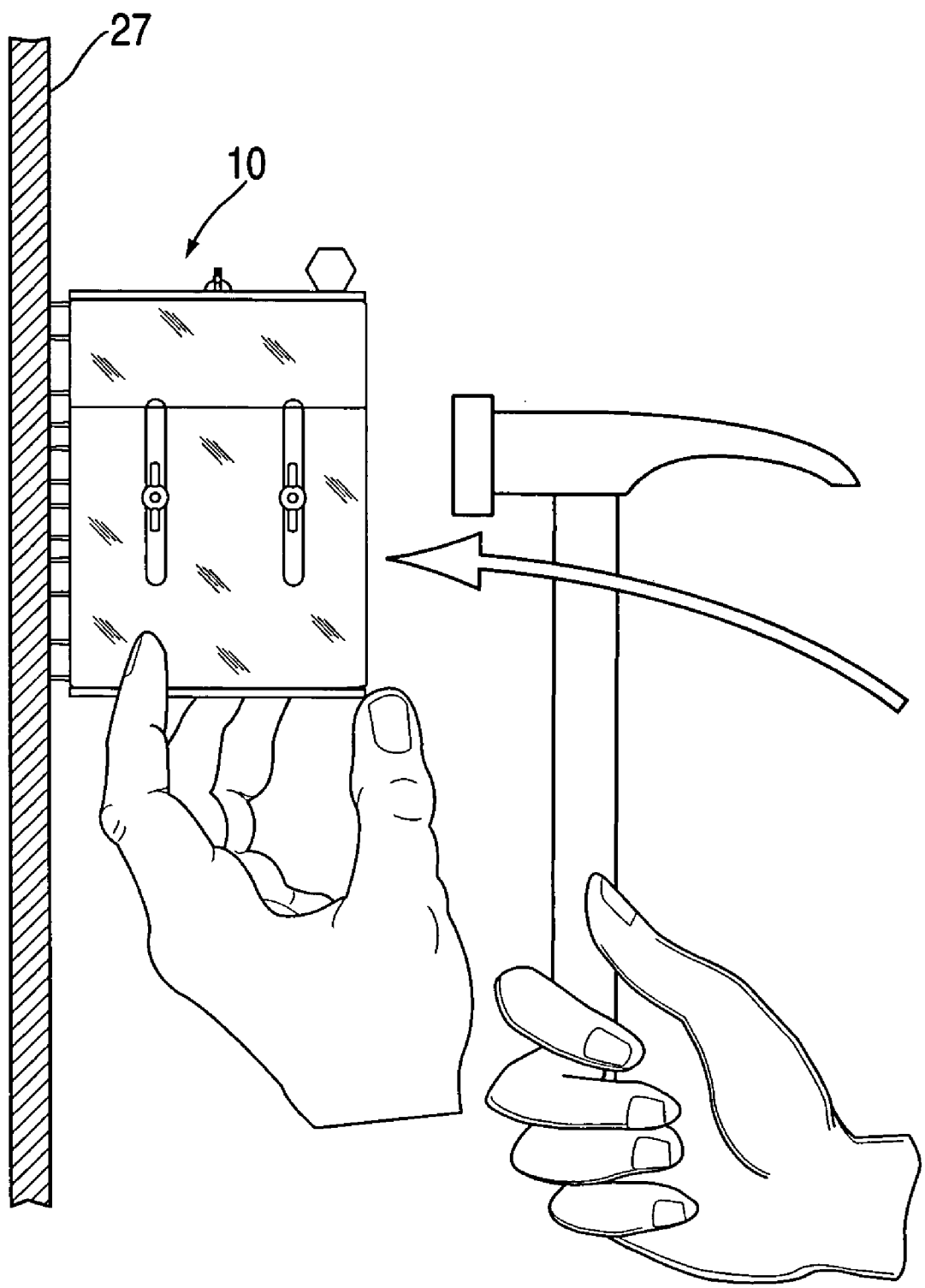
FIG. 4 is an illustration of the use of the embodiment illustrated in FIG. 1.

FIG. 4 illustrates the use of the embodiment illustrated in FIGS. 1 to 3. After adjusting the mating shells 12 and 14 to the desired size and shape, the user would place the back surface 25 of the box 10 in the area of an existing wall where it is desired to install a new electrical junction box. The bubble level 26 would be used to ensure that the cutout for the junction box is horizontally level. The user would then push the device against the wall or use a hammer or similar device so that the plurality of projections 24 pierce the front surface of the wall 27. The box 10 is then removed leaving a template for a cut-out where the projections 24 pierced the front surface of the wall 27. A knife or other sharp implement would then be used to actually cut-out the hole in the wall for the junction box. At that point the junction box would be installed as normal.

Figure 5:
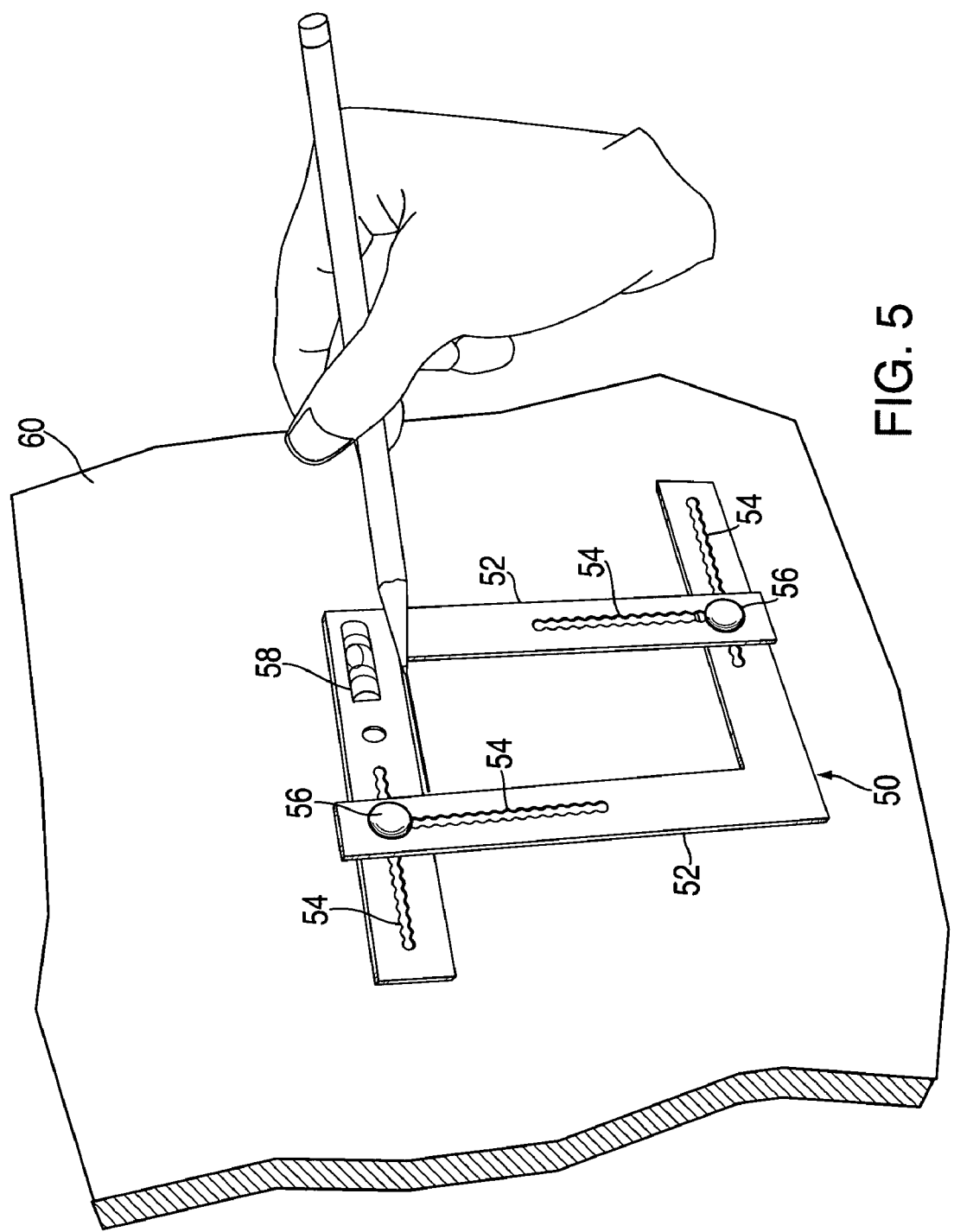
FIG. 5 is a plan view of an alternate embodiment of the present invention.

FIG. 5 illustrates an alternate embodiment of the present invention. An adjustable template 50 is comprised of two mating generally L-shaped angles 52. The L-shaped angles 52 each comprise two longitudinal slots 54. The two L-shaped angles are slidingly connected by fasteners 56 that can be adjusted to vary the force used to move the two L-shaped angles 52 relative to each other and to lock them in place. A bubble level 58 is affixed to the template 50.

As with the previous embodiment, the adjustable template 50 is adjusted to the shape and size of the electrical junction box to be installed by moving the two L-shaped angles relative to each other. The adjustable template 50 is then placed against the wall 60 and leveled using the bubble level 58. The user then sketches the shape of the cut-out for the junction box using a pencil. A knife or other sharp implement is then used to cut out the junction box opening. It is also contemplated that magnets could be incorporated in the two L-shaped angles 52 and fasteners 56 such as snap rivets, wing nuts or rubber grommets to hold the template 50 in place after adjustment to the proper size.

Figure 6:
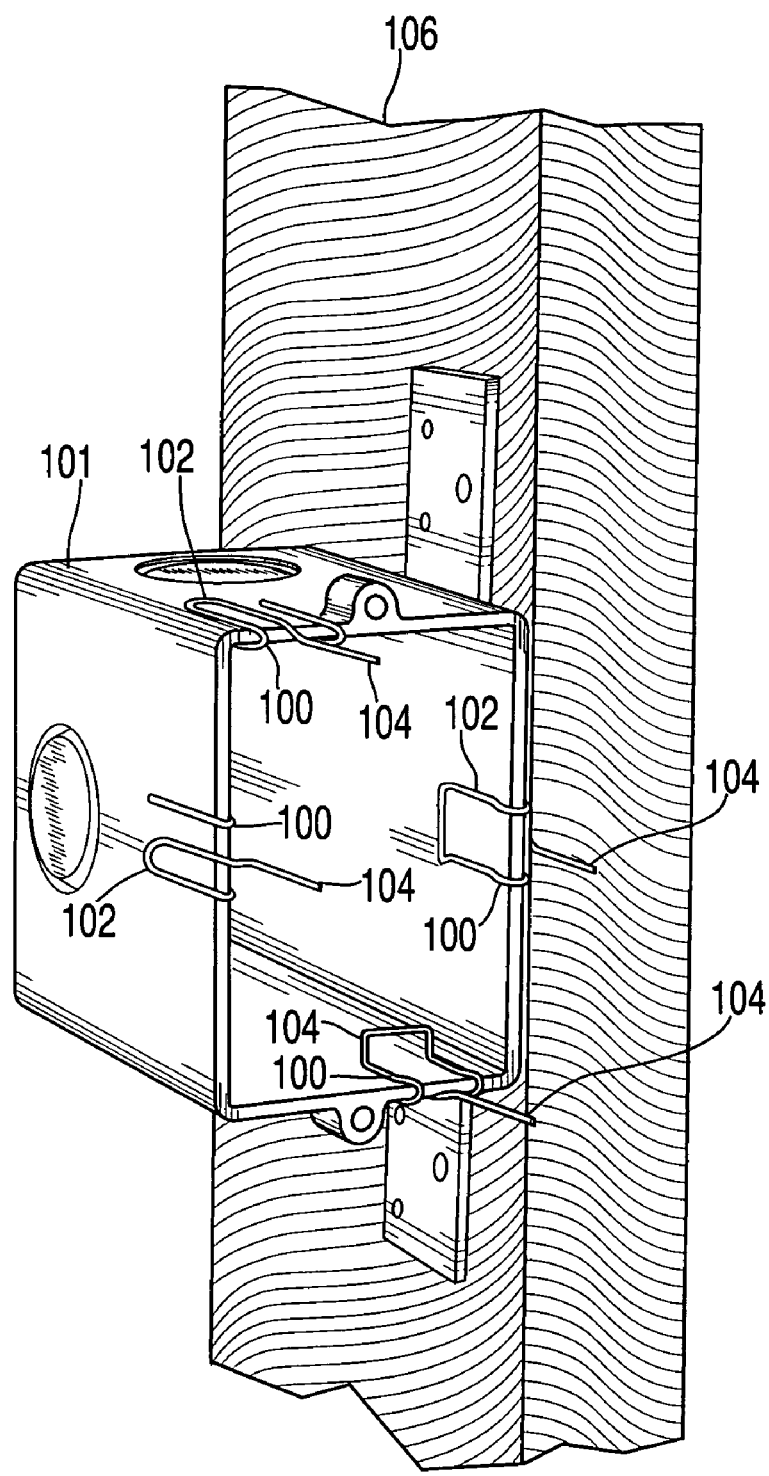
FIG. 6 is a plan view of a second alternate embodiment of the present invention.
Figure 7:
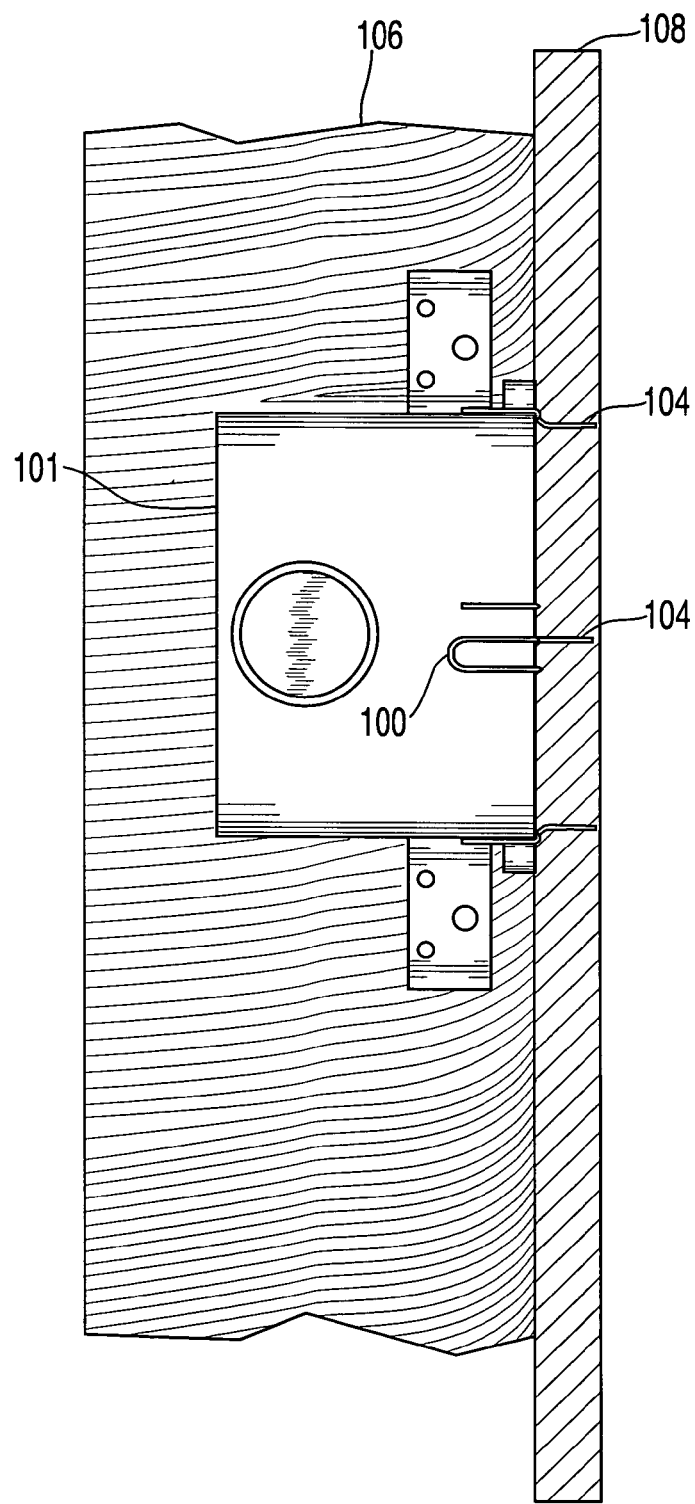
FIG. 7 is an illustration of the use of the embodiment illustrated in FIG. 6.

The third embodiment illustrated in FIGS. 6 and 7 is directed to creating junction box openings when the sheetrock is first installed to create the walls. The prior two embodiments are generally directed for use on previously installed walls for the addition of junction boxes.

FIG. 6 illustrates add-on clips 100. The clips 100 are formed from stiff metal and attached to a junction box 101 prior to installation of the sheetrock walls. The clips comprise a base 102 for sliding attachment to the junction box and sharp protrusions 104. The shape of the base 102 creates an adjustable tension so the clip 100 stays in place and can be adjusted to different wall thicknesses. As is normal in new construction, the junction box 101 is attached to wall studs 106. The sheetrock 108 is then attached to the stud 106. The sharp protrusions 104 will protrude through the front surface of the sheetrock 108 allowing the opening for the junction box 106 to be accurately located and cut out. Only two or three projections are necessary to locate the junction box 106 since one of the prior embodiments could be used for the cutout itself once the box is located.

Those of ordinary skill in the art will recognize that the foregoing merely describes various embodiments of the present invention and that many obvious modifications may be made thereto without departing from the specific scope of the present invention as set forth in the appended claims.

What is claimed is:

1. A method for sizing and locating a cut-out in an existing wall for an electrical junction box comprising the steps of:
   a. providing a template comprising an adjustable opening therein, a leveling device and a plurality of stiff projections on a back surface of the template;
   b. adjusting the opening so that the size and shape of the opening approximately matches the size and shape of the electrical junction box to be installed;
   c. placing the template on the wall with the plurality of stiff projections in contact with a front surface of the wall;
   d. leveling the template using the leveling device;
   e. using force manually or with a hammer or other device on a front surface of the template so that the plurality of stiff projections pierce the front surface of the wall and create a plurality of small holes in the front surface of the wall;
   f. removing the template from the wall; and
   g. using a knife or other sharp implement to create the cut-out for the electrical junction box at the plurality of small holes.

* * * * *